(12) United States Patent
Van Loo

(10) Patent No.: US 7,783,731 B2
(45) Date of Patent: Aug. 24, 2010

(54) FIRMWARE CACHE COHERENCE

(75) Inventor: James Van Loo, Los Altos, CA (US)

(73) Assignee: Microsoft Corporation, Redmond, WA (US)

( * ) Notice: Subject to any disclaimer, the term of this patent is extended or adjusted under 35 U.S.C. 154(b) by 139 days.

(21) Appl. No.: 12/127,015

(22) Filed: May 27, 2008

(65) Prior Publication Data

US 2009/0300135 A1 Dec. 3, 2009

(51) Int. Cl.
*G06F 15/177* (2006.01)
*G06F 15/16* (2006.01)

(52) U.S. Cl. ...................... 709/220; 709/219

(58) Field of Classification Search ......... 709/217–219, 709/220–223
See application file for complete search history.

(56) References Cited

U.S. PATENT DOCUMENTS

| | | | | |
|---|---|---|---|---|
| 6,314,465 | B1 * | 11/2001 | Paul et al. ................ | 709/226 |
| 6,389,462 | B1 * | 5/2002 | Cohen et al. .............. | 709/218 |
| 6,405,256 | B1 * | 6/2002 | Lin et al. .................. | 709/231 |
| 6,584,074 | B1 | 6/2003 | Vasamsetti | |
| 7,376,870 | B2 * | 5/2008 | Kataria et al. ............. | 714/47 |
| 2004/0073902 | A1 | 4/2004 | Kao et al. | |
| 2004/0148379 | A1 * | 7/2004 | Ogura ...................... | 709/223 |
| 2005/0132061 | A1 | 6/2005 | T'Joens | |
| 2005/0213581 | A1 | 9/2005 | Ah Sue | |
| 2006/0077423 | A1 | 4/2006 | Mathieson et al. | |
| 2006/0120305 | A1 | 6/2006 | Van Den Bosch et al. | |
| 2006/0235949 | A1 * | 10/2006 | Tai et al. .................. | 709/219 |
| 2006/0256813 | A1 | 11/2006 | Brusca et al. | |
| 2006/0271666 | A1 | 11/2006 | Jones | |
| 2007/0025341 | A1 | 2/2007 | Baigal et al. | |
| 2007/0201508 | A1 | 8/2007 | Blackford et al. | |
| 2007/0220093 | A1 | 9/2007 | Bracke | |
| 2008/0065816 | A1 * | 3/2008 | Seo ......................... | 711/103 |
| 2009/0300136 | A1 | 12/2009 | Van Loo | |

FOREIGN PATENT DOCUMENTS

| | | |
|---|---|---|
| US | EP1035722 A1 | 9/2000 |
| WO | WO2006108685 | 10/2006 |
| WO | WO2007044326 A2 | 4/2007 |

OTHER PUBLICATIONS

"Firmware Management", http://www.cisco.com/univercd/cc/td/doc/product/rtrmgmt/bac/bac30/adming/chap_6.htm.
"TR-069 DSL Forum CPE WAN management protocol", http://www.jungo.com/openrg/datasheets/jungo_dsheet_tr069.pdf.
"CPE WAN Management Protocol", http://www.dslforum.org/techwork/tr/TR-069.pdf.
"TR-069 Interoperability: The Real Story", http://www.finepoint.com/pdfs/tr-069-interoperability.pdf.

(Continued)

*Primary Examiner*—Yemane Mesfin

(57) ABSTRACT

Firmware cache coherence is described. In embodiment(s), a remote management service can establish a client session with a client device and provide an address that redirects the client device to a firmware download service when the client device initiates a session request with the remote management service. The firmware download service can cache the executable program code, and then initiate a download of the executable program code to the client device when the client device initiates a download request for the executable program code.

20 Claims, 8 Drawing Sheets

OTHER PUBLICATIONS

Kumar, "TR-069 Brings Flexibility to DSL Remote Management", analog zone, retrieved at <<http://www.analogzone.com/nett0724.pdf>>, pp. 7.

"CT-APS Auto-configuration Provisioning System", retrieved at <<http://www.comtrend.com/index.php?module=products&op=show&sn=68>>, pp. 2.

"Aspects of Home Network supporting IPTV Services", Acting Editors, 5th IPTV meeting, Jul. 2007, pp. 1-62.

Nikolaidis, et al., "Local and Remote Management Integration for Flexible Service Provisioning to the Home", IEEE Communications Magazine, vol. 45, Issue 10, Oct. 2007, IEEE, pp. 130-138.

"Non-Final Office Action", U.S. Appl. No. 12/127,016, (Jan. 4, 2010),9 pages.

"Notice of Allowance", U.S. Appl. No. 12/127,016, (May 18, 2010), 12 pages.

* cited by examiner

US 7,783,731 B2

FIRMWARE CACHE COHERENCE

BACKGROUND

Technical Report 069 (TR-069) is the Digital Subscriber Line (DSL) Forum technical specification entitled CPE WAN Management Protocol (CWPM) that defines an application layer protocol for remote management of customer premise equipment, client devices, and/or end-user devices. The remote management protocol specification aggregates a session function, a remote management function, and a firmware download service function into a single remote procedure call interface. The remote management protocol specification provides for communication between auto-configuration servers and customer premise equipment for the remote management and configuration of the devices.

SUMMARY

This summary is provided to introduce simplified concepts of firmware cache coherence. The simplified concepts are further described below in the Detailed Description. This summary is not intended to identify essential features of the claimed subject matter, nor is it intended for use in determining the scope of the claimed subject matter.

Firmware cache coherence is described. In embodiment(s), a remote management service can establish a client session with a client device and provide an address that redirects the client device to a firmware download service when the client device initiates a session request with the remote management service. The firmware download service can cache the executable program code, and then initiate a download of the executable program code to the client device when the client device initiates a download request for the executable program code.

In other embodiment(s), the firmware download service can communicate a download message that enables the client device to resolve a location from which to download the executable program code. The location from which to download the executable program code can be a remote location from the firmware download service, and the download message enables the client device to resolve the remote location.

BRIEF DESCRIPTION OF THE DRAWINGS

Embodiments of firmware cache coherence are described with reference to the following drawings. The same numbers are used throughout the drawings to reference like features and components.

DETAILED DESCRIPTION

Embodiments of firmware cache coherence provide a remote management system that includes an auto-configuration service for remote management and auto-configuration of various client devices, customer premise equipment, and end-user devices. The remote management system includes a remote management service and a firmware download service that can each be implemented as separate delegates of the auto-configuration service, or as cascaded service delegates.

The remote management service and the firmware download service can be implemented as interfaces that are instantiated as separate components at a network node, or alternatively, as independent components at different network nodes (e.g., on separate networked devices). Session functions of the auto-configuration service combined with functions of the remote management service can be partitioned, or otherwise isolated, from session functions of the auto-configuration service combined with functions of the firmware download service such that the remote management service and the firmware download service are separate remote procedure call interfaces.

In one or more embodiments, the auto-configuration service, remote management service, and firmware download service of a remote management system can leverage the message set from the remote management protocol specification (i.e., the Digital Subscriber Line (DSL) Forum technical specification for CPE WAN Management Protocol). The remote management protocol specification messages can be utilized to implement features of firmware cache coherence to cache executable program code, and/or to implement features of scalable transfer feedback to cascade feedback indications via the services of the remote management system.

While features and concepts of the described systems and methods for firmware cache coherence can be implemented in any number of different environments, systems, and/or various configurations, embodiments of firmware cache coherence are described in the context of the following example systems and environments.

Figure 1:
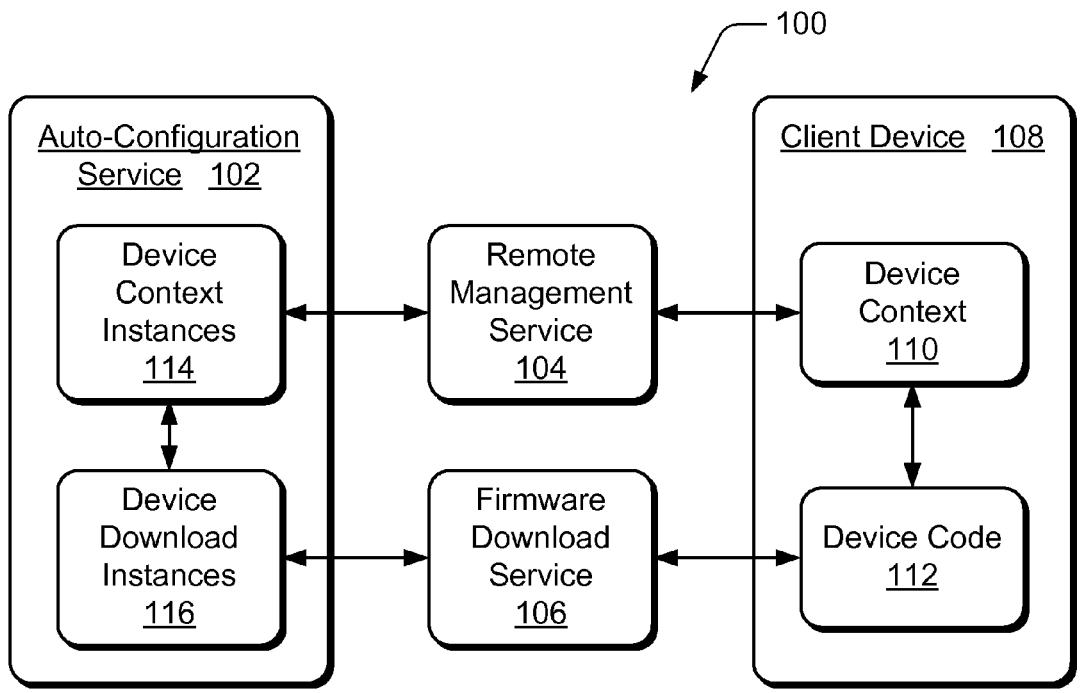
FIG. 1 illustrates an example remote management system in which embodiments of firmware cache coherence can be implemented.

FIG. 1 illustrates an example remote management system 100 in which various embodiments of firmware cache coherence can be implemented. In this example, system 100 includes an auto-configuration service 102, a remote management service 104, and a firmware download service 106. The remote management service 104 and the firmware download service 106 can each be implemented as separate delegates of the auto-configuration service 102 to facilitate remote management and auto-configuration of various client devices, such as client device 108. The client device 108 may be any type of customer premise equipment, television client device, and/or end-user device that is implemented for network communication with the auto-configuration service 102 and/or the delegates for remote management, configuration, updates, status reporting, diagnostics, and the like.

In this example, the remote management service 104 and the firmware download service 106 can be implemented as interfaces that are instantiated as separate components at a network node, or alternatively, as independent components at different network nodes (e.g., on separate networked devices). In an embodiment, session functions of the auto-configuration service 102 combined with the functions of the remote management service 104 can be partitioned, or otherwise isolated, from session functions of the auto-configuration service 102 combined with the functions of the firmware download service 106 such that the remote management service 104 and the firmware download service 106 are separate remote procedure call interfaces.

The client device 108 (e.g., any type of customer premise equipment) can interact with the remote management service 104 to configure device context 110 (e.g., device configuration), and can interact with the firmware download service 106 to configure device code 112 (e.g., executable code files that are independent of the configuration context). As described herein, "device code" and "executable program code" can include any implementation of software, firmware, programs, applications, or any combination thereof. In an embodiment, the auto-configuration service 102 can be partitioned into device context instances 114 and device download instances 116 that correspond to respective client device contexts (e.g., device context 110 of client device 108) and to respective client device code (e.g., device code 112 of client device 108).

The auto-configuration service 102 configures both the device context 110 and the device code 112 of the client device 108. The auto-configuration service 102 can instruct the client device 108, via the remote management service 104, as to which downloads of executable program code are available, as well as when and where to initiate a request for the downloads. The auto-configuration service 102 also can also export a file transport interface, such as File Transfer Protocol (FTP) or other data protocol transports. In this example configuration, communication between the remote management service 104 and the firmware download service 106 is not direct, but rather, state information can be communicated between the delegates via the auto-configuration service 102.

The auto-configuration service 102 can be implemented as an independent service, or as a component of a service provider, such as a television content distributor that distributes media content to various client devices that are remotely managed and configured by the content distributor. Where the auto-configuration service 102 is implemented several layers into a network or service provider, the remote management service 104 and the firmware download service 106 that are the delegates of the auto-configuration service can be "closer" to the client devices for faster communication, less latency when responding to commands, for higher bandwidth to download executable program code updates, and the like.

In one or more embodiments, one service of the remote management system 100 can transfer control to another of the services (e.g., the auto-configuration service 102, remote management service 104, and/or firmware download service 106). For example, client device 108 can initiate a session request to establish a client session with auto-configuration service 102 via the remote management service 104, and the remote management service can establish the client session with the client device.

The remote management service 104 can establish the client session and configure the client device 108 with an Internet address and state information. The remote management service 104 can also provide an address of the firmware download service 106 that redirects the client device 108 to the firmware download service 106 when the client device next initiates communication with the remote management system 100 (e.g., the auto-configuration service 102 via the remote management service 104). The client redirection is transparent to the client device 108, and from the perspective of the client device, communication with the remote management system 100 appears to be fully conforming to the remote management protocol specification.

The remote management service 104 can transfer control to the firmware download service 106 to facilitate a download of executable program code to the client device 108. The firmware download service 106 can then transfer control back to the remote management service 104 in anticipation of subsequent network management. A message set to transfer control between the services includes session functions associated with the auto-configuration service 102, management functions associated with the remote management service 104, and download functions associated with the firmware download service 106.

In an embodiment of firmware cache coherence, the services of the remote management system 100 (e.g., the auto-configuration service 102, remote management service 104, and the firmware download service 106) leverage the "inform" and "download" messages from the remote management protocol specification (i.e., the Digital Subscriber Line (DSL) Forum technical specification for CPE WAN Management Protocol). The firmware download service 106 can receive a network location of a firmware package, or other executable program code, via message exchanges with the auto-configuration service 102 and/or the remote management service 104. The firmware download service messages can also be used to cascade transfer feedback to the auto-configuration service 102 and/or to the remote management service 104 in one or more embodiments of scalable transfer feedback. In addition, authentication can be implemented at a transport layer security portion of the stack for firmware download service identification with an "inform" message for client device management.

Figure 2:
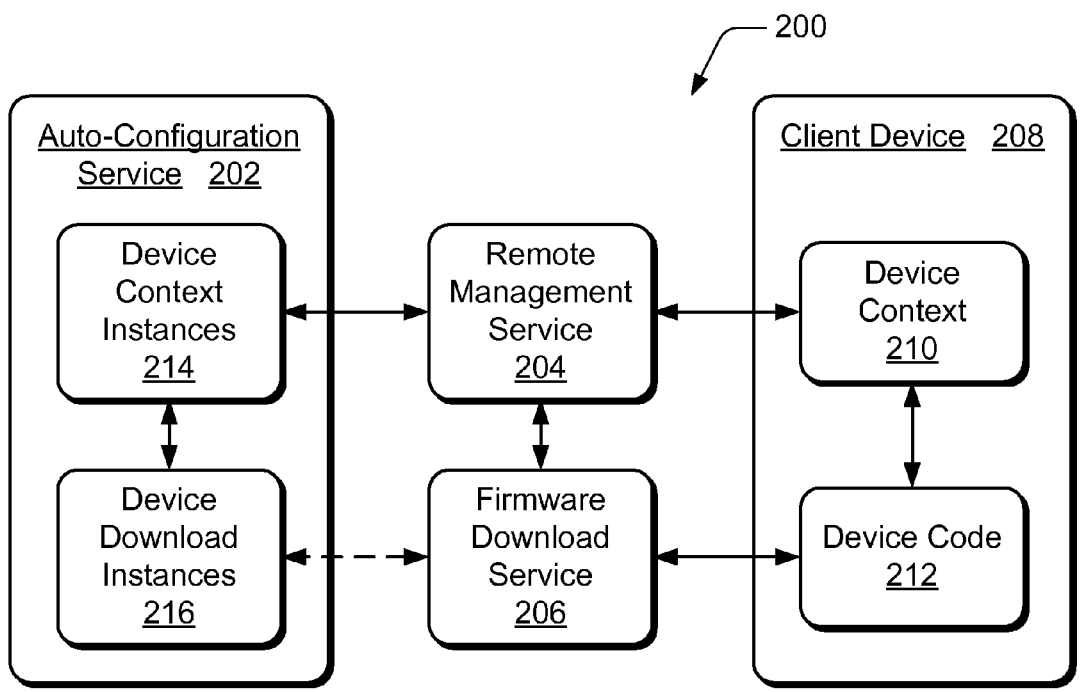
FIG. 2 illustrates another example remote management system in which embodiments of firmware cache coherence can be implemented.

FIG. 2 illustrates another example remote management system 200 in which various embodiments of firmware cache coherence can be implemented. In this example, system 200 includes an auto-configuration service 202, a remote management service 204, and a firmware download service 206. Examples of the services and various functionality are described with reference to the respective auto-configuration service 102, remote management service 104, and firmware download service 106 shown in FIG. 1. In this example remote management system 200, however, the remote management service 204 can be implemented as a delegate of the auto-configuration service 202, and the firmware download service 206 can then be implemented as delegate of the remote management service 204. The separate delegates facilitate remote management, configuration, updates, status reporting, diagnostics, and the like for various client devices, such as client device 208.

In this example, the remote management service 204 and the firmware download service 206 can be implemented as interfaces that are instantiated as separate components at a network node, or alternatively, as independent components at different network nodes (e.g., on separate networked devices). In an embodiment, session functions of the auto-configuration service 202 combined with the functions of the remote management service 204 can be partitioned, or otherwise isolated, from session functions of the auto-configuration service 202 combined with the functions of the firmware download service 206 such that the remote management service 204 and the firmware download service 206 are separate remote procedure call interfaces. In this example configuration, state information can be communicated directly between the remote management service 204 and the firmware download service 206. Optionally, the firmware download service 206 can also communicate state information directly to the auto-configuration service 202.

The client device 208 (e.g., any type of customer premise equipment) can interact with the remote management service 204 to configure device context 210 (e.g., device configuration), and can interact with the firmware download service 206 to configure device code 212 (e.g., executable code files that are independent of the configuration context). In an embodiment, the auto-configuration service 202 can be partitioned into device context instances 214 and device download instances 216 that correspond to respective client device contexts (e.g., device context 210 of client device 208) and to respective client device code (e.g., device code 212 of client device 208).

Although not shown, an auto-configuration service of a remote management system (e.g., auto-configuration service 102 shown in FIG. 1, or auto-configuration service 202 shown in FIG. 2) can be implemented to control or manage multiple pairs of service delegates (e.g., a remote management service and corresponding firmware download service) to facilitate remote management and auto-configuration of multiple client devices.

Figure 3:
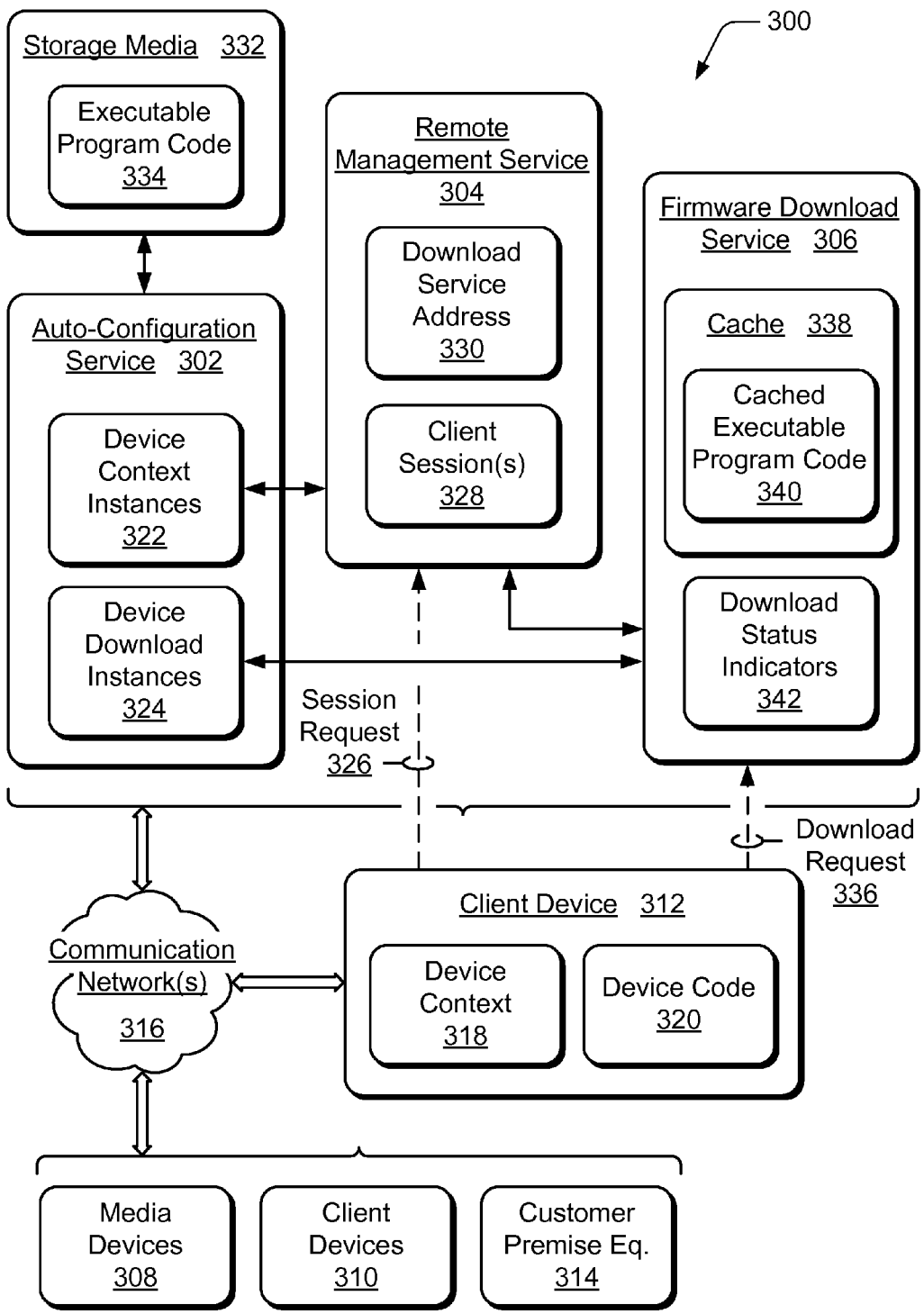
FIG. 3 illustrates another example remote management system in which embodiments of firmware cache coherence can be implemented.

FIG. 3 illustrates another example remote management system 300 in which various embodiments of firmware cache coherence can be implemented. In this example, system 300 includes an auto-configuration service 302, a remote management service 304, and a firmware download service 306. Examples of the services and various functionality are described with reference to the respective auto-configuration service 102, remote management service 104, and firmware download service 106 shown in FIG. 1. Additional examples of the services and various functionality are described with reference to the respective auto-configuration service 202, remote management service 204, and firmware download service 206 shown in FIG. 2.

The remote management system 300 can be implemented for remote management and auto-configuration of various devices, such as media devices 308, client devices 310 and 312, and/or customer premise equipment 314 that are networked via communication network(s) 316. The client device 312 may be any type of customer premise equipment, television client device, and/or end-user device that is implemented for network communication with the auto-configuration service 302 and/or the delegates for remote management, configuration, updates, status reporting, diagnostics, and the like.

Communication network(s) 316 can be implemented to include any type of a DSL network, data network, voice network, broadcast network, and/or an IP-based network that facilitates data communication for remote management and auto-configuration of the various media and client devices. The communication network(s) 316 can be implemented using any type of network topology and/or communication protocol, and can be represented or otherwise implemented as a combination of two or more networks. Any one or more of the arrowed communication links facilitate two-way data communication, such as from the remote management service 304 to client device 312 and vice-versa.

In this example system 300, the remote management service 304 and the firmware download service 306 can each be implemented as separate delegates of the auto-configuration service 102 as described with reference to the example remote management system 100 shown in FIG. 1 to facilitate remote management and auto-configuration of client device 312. Alternatively, the remote management service 304 can be implemented as a delegate of the auto-configuration service 302, and the firmware download service 306 can then be implemented as a delegate of the remote management service 304 as described with reference to the example remote management system 200 shown in FIG. 2 to facilitate remote management and auto-configuration of client device 312.

In this example, the remote management service 304 and the firmware download service 306 can be implemented as interfaces that are instantiated as separate components at a network node, or alternatively, as independent components at different network nodes (e.g., on separate networked devices). In an embodiment, session functions of the auto-configuration service 302 combined with the functions of the remote management service 304 can be partitioned, or otherwise isolated, from session functions of the auto-configuration service 302 combined with the functions of the firmware download service 306 such that the remote management service 304 and the firmware download service 306 are separate remote procedure call interfaces.

The client device 312 (e.g., any type of customer premise equipment) can interact with the remote management service 304 to configure device context 318 (e.g., device configuration), and can interact with the firmware download service 306 to configure device code 320 (e.g., executable code files that are independent of the configuration context). In an embodiment, the auto-configuration service 302 can be partitioned into device context instances 322 and device download instances 324 that correspond to respective client device contexts (e.g., device context 318 of client device 312) and to respective client device code (e.g., device code 320 of client device 312).

The client device 312 can initiate a session request 326 to establish a client session with auto-configuration service 302 via the remote management service 304. The remote management service 304 can establish the client session 328 and configure the client device 312 with an Internet address and state information. The remote management service 304 can also provide a download service address 330 of the firmware download service 306 that redirects the client device 312 to the firmware download service 306 when the client device next initiates communication with the remote management system 300 (e.g., the auto-configuration service 302 via the remote management service 304).

The remote management system 300 can include a networked storage media 332 that maintains or stores executable program code 334, such as software, firmware, programs, applications, or any combination thereof. The firmware download service 306 can facilitate a download of the executable program code 334 to the client device 312 when the client device initiates a download request 336 for the executable program code. The client device 312 communicates the download request 336 to the firmware download service 306 (e.g., via the communication networks 316) based on the download service address 330 provided by the remote management service 304.

In this example system 300, the firmware download service 306 includes a cache 338, or other storage media implemented as any type of memory, random access memory (RAM), read only memory (ROM), any type of magnetic or optical disk storage, and/or other suitable electronic data storage. In an embodiment of firmware cache coherence, the firmware download service 306 can cache (e.g., maintain or store) the executable program code 334 as cached executable program code 340 for download to the various devices, such as client device 312. The remote management service 304 can instruct the firmware download service 306 to cache the executable program code 334 prior to the client device download request 336 for the executable program code. The remote management service 304 can also provide a download schedule message to the client device 312 to indicate when the client device can initiate the download request 336 for the executable program code 334 or the cached executable program code 340 from the firmware download service 306.

In an event that the firmware download service 306 has not cached the executable program code 334 when requested by the client device 312, the firmware download service 306 can communicate a download message to the client device 312 that enables the client device to resolve the location from which to download the executable program code 334. For example, the firmware download service 306 can provide the client device 312 an address of the networked storage media 332 from which the client device 312 can request to download the executable program code 334. The firmware download service 306 can then cache the executable program code 334 from the storage media 332 prior to receiving another download request for the executable program code from any of the other various devices.

In an event that the location of the executable program code 334 is unknown to the firmware download service 306 when the client device 312 initiates the download request 336, the firmware download service 306 can communicate an inform message to the auto-configuration service 302 to indicate that the location of the executable program code 334 is unknown to the firmware download service. The firmware download service 306 can communicate directly with the auto-configuration service 302 when the remote management system 300 is configured as shown in FIG. 1. The firmware download service 306 can then receive a download message from the auto-configuration service 302 that includes the location of the networked storage media 332 which enables the firmware download service 306 to cache the executable program code.

Alternatively, the firmware download service 306 can communicate an inform message to the remote management service 304 to indicate that the location of the executable program code 334 is unknown to the firmware download service. The firmware download service 306 can communicate directly with the remote management service 304 when the remote management system 300 is configured as shown in FIG. 2 and the service delegates are cascaded. For example, the firmware download service 306 is a delegate of the remote management service 304 which, in turn, is a delegate of the auto-configuration service 302. The firmware download service 306 can then receive a download message from the remote management service 304 that includes the location of the networked storage media 332 which enables the firmware download service to cache the executable program code.

The remote management service 304 can receive an inform message from the firmware download service 306 that indicates the location of the executable program code 334 is unknown to the firmware download service 306. In an embodiment, the inform message from the firmware download service can include an identifier of the client device 312 from which the download request 336 is received. The remote management service 304 can then communicate the inform message to the auto-configuration service 302 to indicate that the location of the executable program code 334 is also unknown to the remote management service. The remote management service 304 can then receive a download message from the auto-configuration service 302 that indicates the location of the executable program code (e.g., provides an address of the storage media 332), and communicate the download message to the firmware download service 306 that enables the firmware download service to resolve the location from which to cache the executable program code 334.

In an embodiment of firmware cache coherence, the services of the remote management system 100 (e.g., the auto-configuration service 302, remote management service 304, and the firmware download service 306) leverage the "inform" and "download" messages from the remote management protocol specification (i.e., the Digital Subscriber Line (DSL) Forum technical specification for CPE WAN Management Protocol). The firmware download service 306 can receive a network location of the executable program code 334, or other executable program code, via message exchanges with the auto-configuration service 302 and/or the remote management service 304. The firmware download service messages can also be used to cascade transfer feedback to the auto-configuration service 302 and/or to the remote management service 304 in one or more embodiments of scalable transfer feedback.

In an embodiment of scalable transfer feedback, the firmware download service 306 includes download status indicators 342 that can be used as a scoring or tracking system to track which of the various media devices, client devices, and/or end-user devices receive a download or upgrade of the executable program code 334. The firmware download service 306 can communicate a download status indicator 342 to the client device 312 when a download of the executable program code 334 or the cached executable program code 340 is initiated. The firmware download service 306 can then receive the download status indicator 342 back from the client device 312 when the download of the executable program code is complete. The firmware download service 306 can then communicate the download status indicator 342 that is received from the client device 312 to the remote management service 304.

In an embodiment, the remote management service 304 is implemented to allocate the download status indicators 342 to the firmware download service 306 that then provides a download status indicator to the client device 312. When the remote management service 304 receives a download status indicator 342 back from the firmware download service 306, the remote management service can then communicate the download status indicator 342 to the auto-configuration service 302. The download status indicator 342 is a cascaded feedback indication from the firmware download service 306, to the remote management service 304, and to the auto-configuration service 302. The auto-configuration service 302 can then track which of various devices download the executable program code 334 by the respective download status indicators 342 that are received as cascaded feedback from the remote management service 304 via the firmware download service 306.

In one or more embodiments, the auto-configuration service 302, remote management service 304, and firmware download service 306 of the remote management system 300 can leverage the remote management protocol specification and the message set of the Digital Subscriber Line (DSL) Forum technical specification for CPE WAN Management Protocol which defines an application layer protocol for remote management of customer premise equipment, client devices, and/or end-user devices. Although embodiments of firmware cache coherence scales to other network designs, various aspects and features of the remote management protocol specification are described following.

In an embodiment, firmware cache coherence can conform to the remote management protocol specification, and includes protocols to initialize a Dynamic Host Configuration Protocol (DHCP) of a device state, resolve Domain Name System (DNS) network locations to network addresses, and synchronize Network Time Protocol (NTP) time references. Additional protocols can include the Simple Object Access Protocol (SOAP), HyperText Transfer Protocol (HTTP), Transport Layer Security (TLS), Transmission Control Protocol (TCP), File Transfer Protocol (FTP), and/or the Trivial File Transfer Protocol (TFTP). The Dynamic Host Configuration Protocol (DHCP) initializes a device context, such as the location of the DNS service, the location of the NTP service, and the location of the remote management service 304.

The content of the interface messages of the auto-configuration service 302 can be implemented as eXtensible Markup Language (XML), and the protocol stack can be implemented in an order of: XML, SOAP, HTTP, TLS, TCP, IP, and DSL. For the message transport, the standard can include Simple Object Access Protocol (SOAP) over HyperText Transfer Protocol (HTTP) over Transport Layer Security (TLS) over Transmission Control Protocol (TCP) over Internet Protocol (IP). In the context of Digital Subscriber Line Forum specifications, the network protocol below the Internet strata can be a variation of the Digital Subscriber Line.

Although embodiments of firmware cache coherence can be implemented to conform to the remote management protocol specification, the message set is partitioned. Table A includes the message set from the perspective of the customer premise equipment (e.g., client device 312). The request column indicates that the customer premise equipment initiates an exchange with one of the request messages, while the response column indicates that the customer premise equipment terminates the exchange with one of the response messages. The notations for the request column and the response column in Table A (and for the other message sets included herein) are: "M" is must, "S" is should, "O" is optional, "SN" is should not, and "MN" is must not, as applicable for respective requests and/or responses.

TABLE A

| Method | Request | Response |
|---|---|---|
| Inform | M | MN |
| GetRPCMethods | M | M |
| GetParameterNames | MN | M |
| GetParameterValues | MN | M |
| SetParameterValues | MN | M |
| GetParameterAttributes | MN | M |
| SetParameterAttributes | MN | M |
| GetOptions | MN | O |
| SetVochers | MN | O |
| AddObject | MN | M |
| DeleteObject | MN | M |
| Download | MN | M |
| Upload | MN | O |
| TransferComplete | M | MN |
| RequestDownload | O | MN |
| ScheduleInform | MN | O |
| GetQueuedTransfers | MN | O |
| Reboot | MN | M |
| FactoryReset | MN | O |
| Kicked | MN | O |
| Connect* | MN | M |
| Close* | M | M |

The "Connect" message and the "Close" message in Table A are fictitious. These functions are part of the HTTP message exchange rather than the SOAP message exchange. To signal the close of the session, for example, the service responds to a previous http.post without message content. Table A includes the "Connect" message and the "Close" message in anticipation of message exchange patterns described in more detail below.

The message set is partitioned into the three functions corresponding to the auto-configuration service 302 (e.g., the session function), the remote management service 304 (e.g., the remote management function for the configuration of device network state), and the firmware download service 306 (e.g., the firmware download function). The session message set is shown in Table B, the remote management message set is shown in Table C, and the firmware download message set is shown in Table D. The firmware download function supports the detection of available firmware downloads, the publication of the firmware location (e.g., as firmware file(s) or package(s)), and confirmation of file transfer status. The firmware download function can also share the message of the remote management function that transfers control between the firmware download function (e.g., corresponding to the firmware download service 306) and the remote management function (e.g., corresponding to the remote management service 304).

TABLE B

| Session Method | Request | Response |
|---|---|---|
| Inform | M | MN |
| GetRPCMethods | M | M |
| ScheduleInform | MN | O |
| Connect | MN | M |
| Close | M | M |

TABLE C

| Remote Management Method | Request | Response |
|---|---|---|
| GetParameterNames | MN | M |
| GetParameterValues | MN | M |
| SetParameterValues | MN | M |
| GetParameterAttributes | MN | M |
| SetParameterAttributes | MN | M |
| GetOptions | MN | O |
| AddObject | MN | M |
| DeleteObject | MN | M |
| Reboot | MN | M |
| FactoryReset | MN | O |
| Kicked | MN | O |

TABLE D

| Firmware Download Method | Request | Response |
|---|---|---|
| GetParameterAttributes | MN | S |
| SetParameterAttributes | MN | M |
| SetVochers | MN | O |
| Download | MN | M |
| Upload | MN | O |
| TransferComplete | M | MN |
| RequestDownload | O | MN |
| GetQueuedTransfers | MN | O |

When an embodiment of firmware cache coherence is implemented to conform to the remote management protocol specification, two interfaces can be defined that combine the three functions which correspond to the auto-configuration service 302 (e.g., the session function), the remote management service 304 (e.g., the remote management function), and the firmware download service 306 (e.g., the firmware download function). A remote management interface for the remote management service 304 combines the session function and the remote management function. A firmware download interface for the firmware download service 306 can combine the session function and the firmware download function. Table E includes the message set of the remote management interface from the perspective of the client device 312, and Table F includes the message set of the firmware download interface from the perspective of the client device 312.

TABLE E

Remote Management Service Interface

| Method | Request | Response |
| --- | --- | --- |
| Inform | M | MN |
| GetRPCMethods | M | M |
| GetParameterNames | MN | M |
| GetParameterValues | MN | M |
| SetParameterValues | MN | M |
| GetParameterAttributes | MN | M |
| SetParameterAttributes | MN | M |
| GetOptions | MN | O |
| AddObject | MN | M |
| DeleteObject | MN | M |
| ScheduleInform | MN | O |
| Reboot | MN | M |
| FactoryReset | MN | O |
| Kicked | MN | O |
| Connect | MN | M |
| Close | M | M |

TABLE F

Firmware Download Service Interface

| Method | Request | Response |
| --- | --- | --- |
| Inform | M | MN |
| GetRPCMethods | M | M |
| GetParameterAttributes | MN | S |
| SetParameterAttributes | MN | M |
| SetVochers | MN | O |
| Download | MN | M |
| Upload | MN | O |
| TransferComplete | M | MN |
| RequestDownload | O | MN |
| ScheduleInform | MN | O |
| GetQueuedTransfers | MN | O |
| Connect | MN | M |
| Close | M | M |

When an embodiment of firmware cache coherence is implemented to conform to the remote management protocol specification, the remote management interface and the firmware download interface conform to the message exchanges of the protocol specification, but with separate interfaces for the remote management service 304 and the firmware download service 306.

ACS-RMS Message Exchange: Bootstrap Session. For a message exchange between the auto-configuration service (ACS) 302 and the remote management service (RMS) 304, the ACS bootstraps the RMS through the session. The message exchange configures the network state of the RMS. The message exchange also provides the location of the file(s) or package(s) that instruct the RMS with respect to its remote management role, and instruct the FDS with respect to its firmware download role. The ACS initiates the download exchange to publish the directives, and while the download exchange conforms to the auto-configuration service standard, the file name and the file format of the directives is private to the ACS, RMS, and FDS.

The message exchange sequence below is an example, but omits some message arguments except where the arguments relate to the preconditions for subsequent message exchanges:

```
RMS.INFORM(RMS_INFO, BOOTSTRAP)
ACS.INFORM_RESPONSE(MAX_ENVELOPES)
ACS.GET_PARAMETER_NAMES( )
RMS.GET_PARAMETER_NAMES_RESPONSE( )
ACS.GET_PARAMETER_VALUES( )
RMS.GET_PARAMETER_VALUES_RESPONSE( )
ACS.SET_PARAMETER_VALUES( )
RMS.SET_PARAMETER_VALUES_RESPONSE( )
ACS.GET_PARAMETER_ATTRIBUTES( )
RMS.GET_PARAMETER_ATTRIBUTES_RESPONSE( )
ACS.SET_PARAMETER_ATTRIBUTES(CONTEXT)
RMS.SET_PARAMETER_ATTRIBUTES_RESPONSE( )
ACS.DOWNLOAD(COMMAND_KEY, RMS_FILE_URL,
    RMS_FILE_NAME)
RMS.DOWNLOAD_RESPONSE(STATUS, START_TIME,
    COMPLETE_TIME)
ACS.DOWNLOAD(COMMAND_KEY, FDS_FILE_URL,
    FDS_FILE_NAME)
RMS.DOWNLOAD_RESPONSE(STATUS, START_TIME,
    COMPLETE_TIME)
ACS.SET_PARAMETER_ATTRIBUTES(ACS_CONTROL_URL)
RMS.SET_PARAMETER_ATTRIBUTES_RESPONSE( )
ACS.SCHEDULE_INFORM(ACS_SESSION_TIME)
RMS.SCHEDULE_INFORM_RESPONSE(MAX_ENVELOPES)
ACS.CLOSE( )
```

In the message exchange sequence, the INFORM(RMS_INFO, BOOTSTRAP) exchange initiates the session. The RMS_INFO field represents the first field of the message that identifies the device, and the BOOTSTRAP field represents the second field of the message that encodes the reason for the session. In the first steps of the session, the ACS installs the network state of the RMS itself, and the ACS initiates the DOWNLOAD(COMMAND_KEY, RMS_FILE_URL, RMS_FILE_NAME) exchange to signal a location of the file(s) or package(s) that contain the directives the RMS can realize to configure the network state of the CPE. The COMMAND_KEY field represents the first field of the DOWNLOAD message and this string can serve to scoreboard the download instances. The RMS_FILE_URL field is the third field of the DOWNLOAD message that encodes the location of the directives file. The RMS_FILE_NAME field is the seventh field of the DOWNLOAD message and represents the target file name.

The ACS initiates the DOWNLOAD(COMMAND_KEY, FDS_FILE_URL, FDS_FILE_NAME) exchange to signal the location of the file(s) or package(s) that contain the directives the FDS can implement to download firmware to the CPE. The notation for the fields are the same as for the previous DOWNLOAD message. The ACS can initiate the SET_PARAMETER_ATTRIBUTES (ACS_CONTROL_URL) exchange to configure the ACS control location, and the RMS can resolve the location to initiate subsequent ACS-RMS sessions. The ACS can also initiate the SCHEDULE_INFORM(RMS_SESSION_TIME) exchange to define the time at which to initiate the next ACS-RMS session. In an implementation, the SCHEDULE_INFORM (ACS_SESSION_TIME) exchange is an optimization.

The message exchange sequence above is just one of multiple valid message exchanges, and the message exchange can create the preconditions for subsequent ACS-RMS sessions. The preconditions can include: the file(s) or package(s) location that contain the directives the RMS can realize to configure the network state of the FDS and the CPE; the file(s) or package(s) location that contain the directives the FDS can realize to download firmware to the CPE; the location the RMS can resolve to initiate the subsequent ACS-RSM sessions; and/or a time of the next ACS-RMS session.

RMS-FDS Message Exchange: Bootstrap Session. For a message exchange between the remote management service (RMS) 304 and the firmware download service (FDS) 306, the RMS controls the message exchange to initialize the FDS. The ACS can perform the FDS initialization, given that the preconditions for subsequent ACS-FDS sessions are realized. the message exchange sequence below is an example:

```
FDS.INFORM(FDS_INFO, BOOTSTRAP)
RMS.INFORM_RESPONSE(MAX_ENVELOPES)
RMS.GET_PARAMETER_NAMES( )
FDS.GET_PARAMETER_NAMES_RESPONSE( )
RMS.GET_PARAMETER_VALUES( )
FDS.GET_PARAMETER_VALUES_RESPONSE( )
RMS.SET_PARAMETER_VALUES( )
FDS.SET_PARAMETER_VALUES_RESPONSE( )
RMS.GET_PARAMETER_ATTRIBUTES( )
FDS.GET_PARAMETER_ATTRIBUTES_RESPONSE( )
RMS.SET_PARAMETER_ATTRIBUTES(CONTEXT)
FDS.SET_PARAMETER_ATTRIBUTES_RESPONSE( )
RMS.DOWNLOAD(COMMAND_KEY, FDS_FILE_URL,
FDS_FILE_NAME)
FDS.DOWNLOAD_RESPONSE(STATUS, START_TIME,
COMPLETE_TIME)
RMS.SET_PARAMETER_ATTRIBUTES(RMS_CONTROL_URL)
FDS.SET_PARAMETER_ATTRIBUTES_RESPONSE( )
RMS.SCHEDULE_INFORM(RMS_SESSION_TIME)
FDS.SCHEDULE_INFORM_RESPONSE(MAX_ENVELOPES)
RMS.CLOSE( )
```

In the exchange, the RMS can install the network state of the FDS. The RMS initiates the DOWNLOAD(COMMAND_KEY, FDS_FILE_URL, FDS_FILE_NAME) exchange to provide the location of the file(s) or package(s) that contain the directives the FDS can realize to download firmware to the CPE. The RMS can initiate the SET_PARAMETER_ATTRIBUTES (RMS_CONTROL_URL) exchange to configure the RMS control location. The FDS can resolve the location to initiate subsequent RMS-FDS sessions. The RMS can also initiate the SCHEDULE_INFORM(RMS_SESSION_TIME) exchange to define the time at which to initiate the next RMS-FDS session.

The message exchange sequence above is just one of multiple valid message exchanges, and the message exchange can create the preconditions for subsequent RMS-FDS sessions. The preconditions can include: the file(s) or package(s) location with the directives that instruct the FDS to download firmware to the CPE; the location that the FDS is to resolve to initiate subsequent RMS-FDM sessions; and/or the time of the next RMS-FDS session.

RMS-CPE Message Exchange: Bootstrap Session. For a message exchange between the remote management service (RMS) 304 and the customer premise equipment (CPE) (e.g., client device 312), the RMS bootstraps the CPE through the message exchange. The sequence below is an example of a message exchange:

```
CPE.INFORM(CPE_INFO, BOOTSTRAP)
RMS.INFORM_RESPONSE(MAX_ENVELOPES)
RMS.GET_PARAMETER_NAMES( )
CPE.GET_PARAMETER_NAMES_RESPONSE( )
RMS.GET_PARAMETER_VALUES( )
CPE.GET_PARAMETER_VALUES_RESPONSE( )
RMS.SET_PARAMETER_VALUES( )
CPE.SET_PARAMETER_VALUES_RESPONSE( )
RMS.GET_PARAMETER_ATTRIBUTES( )
CPE.GET_PARAMETER_ATTRIBUTES_RESPONSE( )
RMS.SET_PARAMETER_ATTRIBUTES( )
```

-continued

```
CPE.SET_PARAMETER_ATTRIBUTES_RESPONSE(CONTEXT)
RMS.SET_PARAMETER_ATTRIBUTES(RMS_CONTROL_URL)
CPE.SET_PARAMETER_ATTRIBUTES_RESPONSE( )
RMS.SCHEDULE_INFORM(RMS_SESSION_TIME)
FDS.SCHEDULE_INFORM_RESPONSE(MAX_ENVELOPES)
RMS.CLOSE( )
```

The message exchange of the RMS-CPE session is comparable to the message exchange of the ACS-RMS session or the message exchange of the RMS-FDS session. The first message exchanges configure the network state of the CPE, and the RMS can then initiate the RMS.SET_PARAMETER_ATTRIBUTES(RMS_CONTROL_URL) exchange to provide the RMS control location. The CPE can resolve the location to initiate subsequent RMS-CPE sessions. The RMS can also initiate the SCHEDULE_INFORM(RMS_SESSION_TIME) exchange to define the time at which to initiate the next RMS-CPE session. The interactions with the CPE can be separated into a bootstrap event and a subsequent download initialization event (which may also be combined in an alternate embodiment).

RMS-CPE Message Exchange: Download Session. For another message exchange between the remote management service (RMS) 304 and the customer premise equipment (CPE) (e.g., client device 312), the CPE can download executable program code after network configuration of the CPE is complete via the previous message exchange. The message exchange can transfer control from the RMS to the FDS, which then executes the firmware (e.g., or other executable program code) downloads. Once a download session is complete, the FDS can transfer control back to the RMS. The sequence below is an example of the message exchange:

```
CPE.INFORM(CPE_INFO, SCHEDULED)
RMS.INFORM_RESPONSE(MAX_ENVELOPES)
RMS.SET_PARAMETER_ATTRIBUTES(FDS_CONTROL_URL)
CPE.SET_PARAMETER_ATTRIBUTES_RESPONSE( )
RMS.SCHEDULE_INFORM(FDS_SESSION_TIME)
FDS.SCHEDULE_INFORM_RESPONSE(MAX_ENVELOPES)
RMS.CLOSE( )
```

In the example message exchange, the RMS can provide the location that the CPE resolves to initiate subsequent FDS-CPE sessions. The RMS can also initiate the RMS.SCHEDULE_INFORM(RMS_SESSION_TIME) exchange to define the time of a subsequent FDS-CPE session.

FDS-CPE Message Exchange: Download Session. A message exchange between the firmware download service (FDS) 306 and the customer premise equipment (CPE) (e.g., client device 312), can be implemented when a location of the file(s) or packages(s) for the CPE are known to the FDS. The sequence below is an example of the message exchange:

```
CPE.INFORM(CPE_INFO, SCHEDULED)
FDS.INFORM_RESPONSE(MAX_ENVELOPES)
FDS.DOWNLOAD(COMMAND_KEY, CPE_FILE_URL,
CPE_FILE_NAME)
CPE.DOWNLOAD_RESPONSE(STATUS, START_TIME,
COMPLETE_TIME)
FDS.SET_PARAMETER_ATTRIBUTES(RMS_CONTROL_URL)
CPE.SET_PARAMETER_ATTRIBUTES_RESPONSE( )
```

-continued

```
FDS.SCHEDULE_INFORM(RMS_SESSION_TIME)
CPE.SCHEDULE_INFORM_RESPONSE(MAX_ENVELOPES)
FDS.CLOSE( )
```

The FDS can publish the firmware for the CPE via the FDS.DOWNLOAD (COMMAND_KEY, CPE_FILE_URL, CPE_FILE_NAME) exchange. The message exchange sequence can be implemented when a CPE returns a status code (e.g., a download status indicator 342) to signal that a download of executable program code is complete. The FDS can then transfer control back to the RMS, and the FDS can initiate the SET_PARAMETER_ATTRIBUTES (RMS_CONTROL_URL) exchange to configure the location of the RMS for subsequent RMS-CPE sessions. The FDS can also initiate the FDS.SCHEDULE_INFORM(RMS_SESSION_TIME) exchange to define the time to initiate the subsequent RMS-CPE session.

An alternative message exchange sequence below can be implemented when the CPE.DOWNLOAD_RESPONSE (STATUS, START_TIME, COMPLETE_TIME) message signals or otherwise indicates that a download of executable program code is in process. An example of the first FDS-CPE session for this instance is the message exchange sequence:

```
CPE.INFORM(CPE_INFO, SCHEDULED)
FDS.INFORM_RESPONSE(MAX_ENVELOPES)
FDS.DOWNLOAD(COMMAND_KEY, CPE_FILE_URL,
    CPE_FILE_NAME)
CPE.DOWNLOAD_RESPONSE(STATUS, START_TIME,
    COMPLETE_TIME)
FDS.CLOSE( )
```

Once a download of executable program code completes, the CPE can initiate another FDS-CPE session to report the download status. The message exchange is shown below.

```
CPE.INFORM(CPE_INFO, TRANSFER_COMPLETE)
FDS.INFORM_RESPONSE(MAX_ENVELOPES)
CPE.TRANSFER_COMPLETE(COMMAND_KEY,
    FAULT_STRUCT)
FDS.TRANSFER_COMPLETE_RESPONSE( )
FDS.SET_PARAMETER_ATTRIBUTES(RMS_CONTROL_URL)
CPE.SET_PARAMETER_ATTRIBUTES_RESPONSE( )
FDS.SCHEDULE_INFORM(RMS_SESSION_TIME)
CPE.SCHEDULE_INFORM_RESPONSE(MAX_ENVELOPES)
FDS.CLOSE( )
```

The TRANSFER_COMPLETE field of the CPE.INFORM (CPE_INFO, TRANSFER_COMPLETE) message signals that the reason for the session is to report the download status. The CPE can initiate the TRANSFER_COMPLETE exchange to signal the status, the COMMAND_KEY field can encode a specific download instance, and the FAULT_STRUCT field can encode the download status.

If a download of executable program code is successful, the FDS can transfer control back to the RMS. The FDS can initiate the SET_PARAMETER_ATTRIBUTES (RMS_CONTROL_URL) exchange to provide a location the CPE can resolve to create subsequent RMS-CPE sessions. The FDS can also initiate the FDS.SCHEDULE_INFORM (RMS_SESSION_TIME) exchange to define a time for a subsequent RMS-CPE session.

RMS-FDS Message Exchange: Firmware Cache Session. A message exchange between the remote management service (RMS) 304 and the firmware download service (FDS) 306 can be implemented when the appropriate firmware downloads are not known to the FDS, or the FDS has not cached the firmware. For example, the FDS may not have received a directive from the RMS with respect to applicable firmware for the CPE; the FDS has received directives from the RMS with respect to the applicable firmware for the CPE, but the expiration time of the firmware has past; and/or the FDS has received instructions from the RMS with respect to the applicable firmware for the CPE, the expiration time of the firmware has not past, but the firmware does not reside at the FDS. The FDS can consult with the RMS to determine whether the location known to the FDS is stale.

In the last instance, the FDS could provide the remote location to the CPE, which the CPE resolves to download from the remote location. However, if the firmware is also appropriate for download to other CPE, it is efficient for the FDS to download and cache the firmware to itself in anticipation of future sessions and download requests for the firmware (e.g., the cached executable program code 340).

An embodiment of firmware cache coherence can leverage the standard message exchanges when the HTTP:TLS:TCP:IP stack below the RMS:SOAP stack provides multiple mechanisms for the FDS to describe (and authenticate) itself. The TLS protocol, for example, allows the FDS to authenticate itself to the RMS. Once completed, the FDS can initiate a cache coherence session to the RMS with the FDS.INFORM(CPE_INFO, REASON) message. In this instance, the first field of the message is the CPE_INFO field rather than the FDS_INFO field. The RMS can interpret this distinction to mean that the FDS requires download instructions not for itself, but for the CPE that the INFORM describes. An example of the message sequence:

```
FDS.INFORM(CPE_INFO, REASON)
RMS.INFORM_RESPONSE(MAX_ENVELOPES)
RMS.DOWNLOAD(COMMAND_KEY, CPE_FILE_URL,
    CPE_FILE_NAME)
FDS.DOWNLOAD_RESPONSE(STATUS, START_TIME,
    COMPLETE_TIME)
RMS.CLOSE( )
```

The REASON field of the FDS.INFORM message can be implemented as one of the valid codes other than the BOOTSTRAP and TRANSFER_COMPLETE codes of previous exchanges. The FDS.INFORM(CPE_INFO, REASON) exchange instructs the RMS as to which CPE requests firmware (e.g., or other executable program code) downloads. The RMS.DOWNLOAD (COMMAND_KEY, CPE_FILE_URL, CPE_FILE_NAME) exchange instructs the FDS as to the firmware instance for the specific CPE. If the firmware is known to the FDS, but does not reside on the FDS, the available responses can include any of the following three responses.

First response: the FDS can initiate the FDS.DOWNLOAD (COMMAND_KEY, CPE_FILE_URL, CPE_FILE_NAME) exchange with the CPE where the CPE_FILE_URL is the remote location. The CPE can then resolve the remote location and download the firmware (e.g., executable program code).

Second response: the FDS can initiate the FDS.DOWNLOAD(COMMAND_KEY, CPE_FILE_URL, CPE_FILE_NAME) exchange with the CPE where the CPE_FILE_URL is the remote location. The CPE can resolve the remote location and download the firmware (e.g., executable program code). The FDS can also resolve the CPE_FILE_URL location and download the firmware to itself as cached executable program code. The FDS can then retain the firmware for future download sessions, and in anticipation of future download sessions, the FDS can communicate the location of the firmware to the CPE_FILE_URL field of the DOWNLOAD (COMMAND_KEY, CPE_FILE_URL, CPE_FILE_NAME) message.

Third response: Before the FDS initiates the FDS.DOWNLOAD(COMMAND_KEY, CPE_FILE_URL, CPE_FILE_NAME) exchange with the CPE, the FDS can resolve the CPE_FILE_URL location and download the firmware to itself. The FDS can retain the firmware for future download sessions. The FDS can communicate the location of the firmware to the CPE_FILE_URL field of the DOWNLOAD (COMMAND_KEY, CPE_FILE_URL, CPE_FILE_NAME) message. The FDS can then initiate the FDS.DOWNLOAD(COMMAND_KEY, CPE_FILE_URL, CPE_FILE_NAME) exchange with the CPE that resolves the firmware location and downloads the firmware.

Example methods 400 through 700 are described with reference to respective FIGS. 4 through 7 in accordance with one or more embodiments of firmware cache coherence. Generally, any of the functions, methods, procedures, components, and modules described herein can be implemented using hardware, software, firmware, fixed logic circuitry, manual processing, or any combination thereof. A software implementation of a function, method, procedure, component, or module represents program code that performs specified tasks when executed on a computing-based processor. Example methods 400 through 700 may be described in the general context of computer-executable instructions which can include software, applications, routines, programs, objects, functions, methods, procedures, components, modules, and the like.

The method(s) may also be practiced in a distributed computing environment where functions are performed by remote processing devices that are linked through a communication network. In a distributed computing environment, computer-executable instructions may be located in both local and remote computer storage media, including memory storage devices. Further, the features described herein are platform-independent such that the techniques may be implemented on a variety of computing platforms having a variety of processors.

Figure 4:
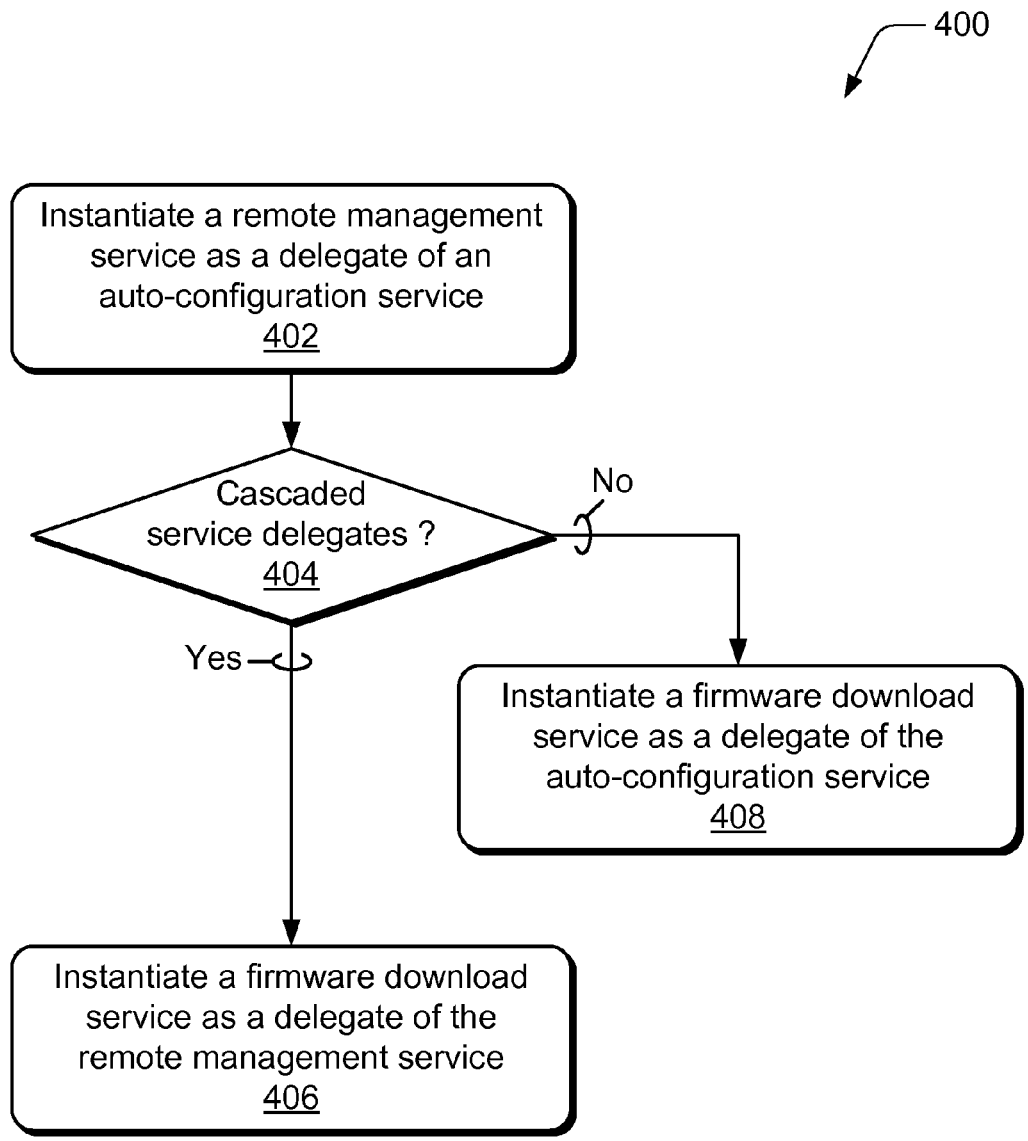
FIG. 4 illustrates example method(s) for firmware cache coherence in accordance with one or more embodiments.

FIG. 4 illustrates example method(s) 400 of firmware cache coherence. The order in which the method is described is not intended to be construed as a limitation, and any number of the described method blocks can be combined in any order to implement the method, or an alternate method.

At block 402, a remote management service is instantiated as a delegate of an auto-configuration service. For example, remote management service 104 is instantiated as a delegate of the auto-configuration service 102 in the remote management system 100 (FIG. 1). Similarly, remote management service 204 is instantiated as a delegate of the auto-configuration service 202 in the remote management system 200 (FIG. 2).

At block 404, a determination is made as to whether the remote management system will be implemented with cascaded service delegates. The service delegates are "cascaded" when a firmware download service is implemented as a delegate of a remote management service which, in turn, is implemented as a delegate of an auto-configuration service. If the remote management system will be implemented with cascaded service delegates (i.e., "yes" from block 404), then at block 406, a firmware download service is instantiated as a delegate of the remote management service. For example, firmware download service 206 is instantiated as a delegate of the remote management service 204 in the remote management system 200. The service delegates are "cascaded" and the firmware download service 206 is a delegate of the remote management service 204 which, in turn, is a delegate of the auto-configuration service 202.

If the remote management service will not be implemented with cascaded service delegates (i.e., "no" from block 404), then at block 408, a firmware download service is also instantiated as a delegate of the auto-configuration service. For example, firmware download service 106 is instantiated as a delegate of the auto-configuration service 102 in the remote management system 100.

Figure 5:
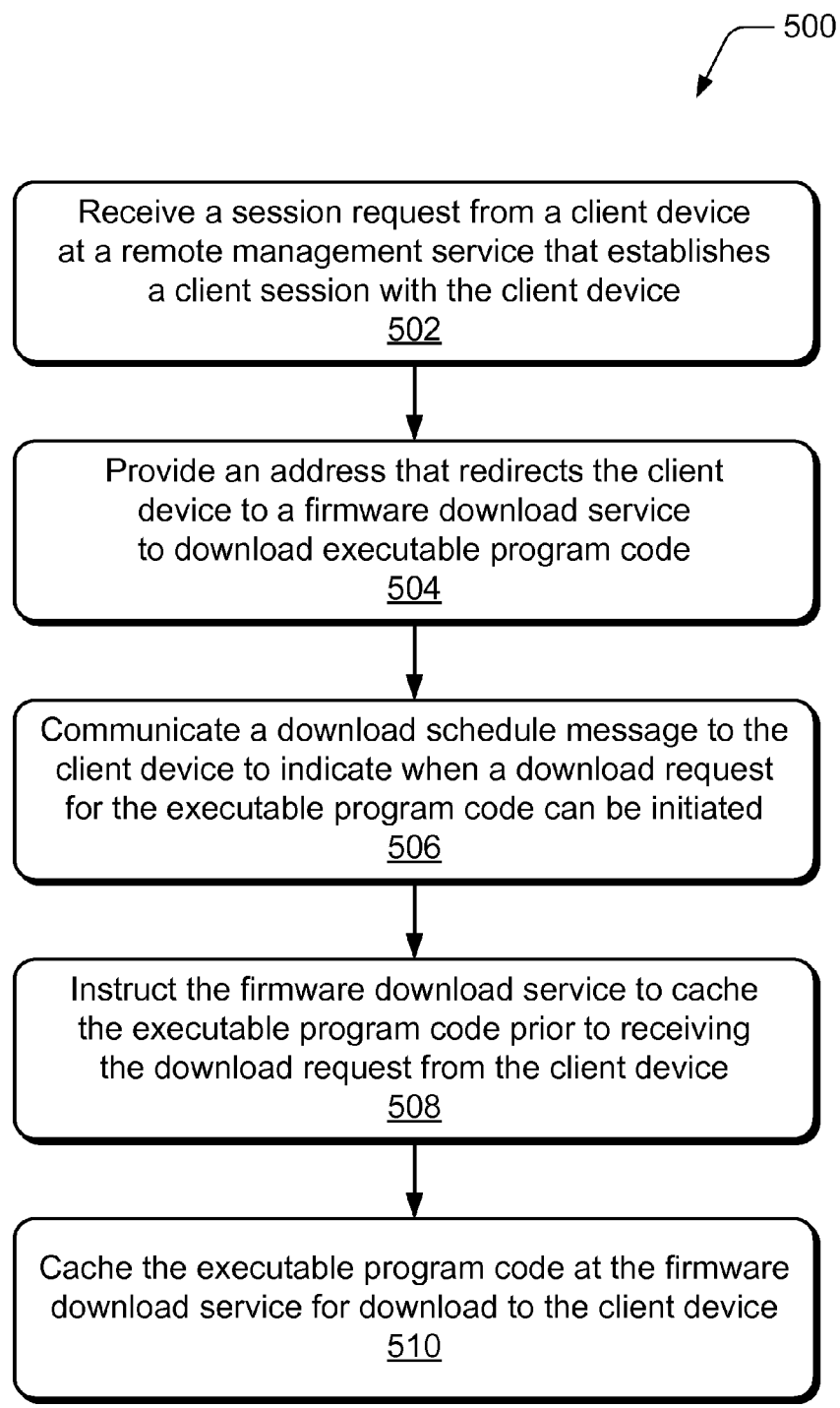
FIG. 5 illustrates example method(s) for firmware cache coherence in accordance with one or more embodiments.

FIG. 5 illustrates example method(s) 500 of firmware cache coherence. The order in which the method is described is not intended to be construed as a limitation, and any number of the described method blocks can be combined in any order to implement the method, or an alternate method.

At block 502, a session request is received from a client device at a remote management service that establishes a client session with the client device. For example, remote management service 304 in the remote management system 300 (FIG. 3) receives a session request 326 from client device 312 and establishes a client session 328 with the client device.

At block 504, an address is provided to the client device that redirects the client device to a firmware download service that facilitates a download of executable program code. For example, remote management service 304 communicates an address 330 of the firmware download service 306 to the client device 312 to redirect the client device for a download or update of executable program code 334 or cached executable program code 340.

At block 506, a download schedule message is communicated to the client device to indicate when the client device can initiate a download request for the executable program code from the firmware download service. For example, remote management service 304 communicates a download schedule message to the client device 312 to indicate when the client device can initiate a download request 336 for the executable program code 334 or cached executable program code 340.

At block 508, the firmware download service is instructed to cache the executable program code prior to the client device initiating the download request for the executable program code. For example, remote management service 304 instructs the firmware download service 306 to cache the executable program code 334 so that it will be available for download when a download request 336 is received from the client device 312.

At block 510, the executable program code is cached at the firmware download service for download to the client device. For example, firmware download service 306 caches the executable program code 334 and maintains the cached executable program code 340 for download to the client device 312 when the client device initiates the download request 336.

Figure 6:
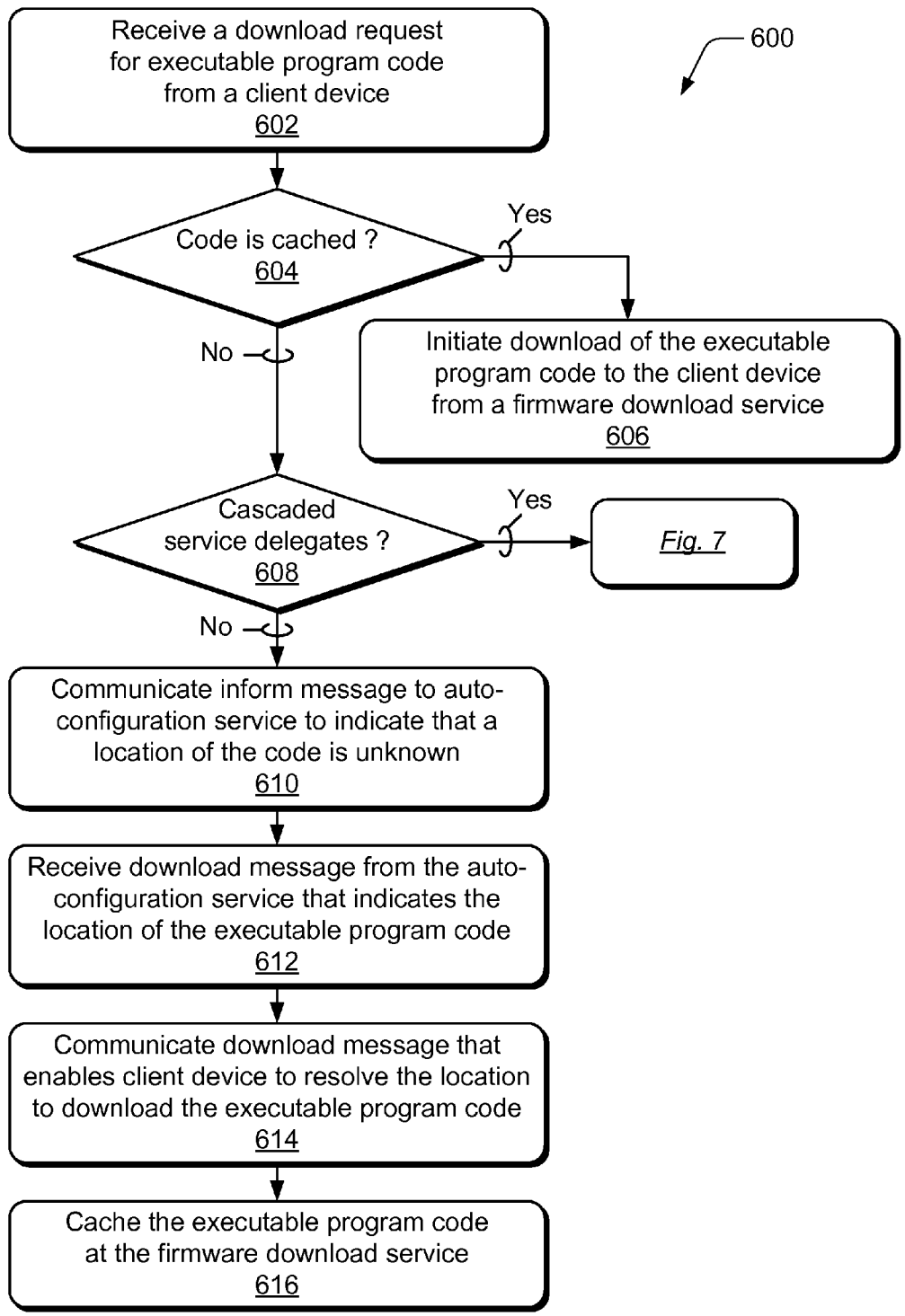
FIG. 6 illustrates example method(s) for firmware cache coherence in accordance with one or more embodiments.

FIG. 6 illustrates example method(s) 600 of firmware cache coherence. The order in which the method is described is not intended to be construed as a limitation, and any number of the described method blocks can be combined in any order to implement the method, or an alternate method.

At block 602, a download request for executable program code is received from a client device. For example, client device 312 initiates a download request 336 for executable program code 334 or cached executable program code 340, such as to install or update an application or firmware. At block 604, a determination is made as to whether the executable program code is cached at a firmware download service. For example, firmware download service 306 caches the executable program code 334 and maintains the cached executable program code 340 for download to the client device 312 when the client device initiates the download request 336.

If the executable program code is cached at the firmware download service (i.e., "yes" from block 604), then at block 606, a download of the executable program code to the client device is initiated from the firmware download service. For example, firmware download service 306 downloads the cached executable program code 340 to the client device 312. If the executable program code is not cached at the firmware download service (i.e., "no" from block 604), then at block 608, a determination is made as to whether the service delegates are cascaded. For example, the service delegates are "cascaded" when the firmware download service 306 is a delegate of the remote management service 304 which, in turn, is a delegate of the auto-configuration service 302.

If the service delegates are not in a cascaded configuration (i.e., "no" from block 608), then at block 610, an inform message is communicated to an auto-configuration service to indicate that a location of the executable program code is unknown to the firmware download service. For example, the firmware download service 306 communicates an inform message to the auto-configuration service 302, and the message includes an identifier of the client device 312 from which the download request 336 is received. The inform message from the firmware download service 306 indicates that the location of the executable program code 334 requested by the client device 312 is unknown to the firmware download service.

At block 612, a download message is received from the auto-configuration service that indicates a location of the executable program code. For example, the firmware download service 306 receives the download message from the auto-configuration service 302 which enables the firmware download service 306 to resolve the location of the executable program code 334 at the networked storage media 332. The download message can include an address of the storage media 332 that maintains or otherwise stores the executable program code 334.

At block 614, a download message is communicated that enables the client device to resolve a location from which to download the executable program code. For example, the firmware download service 306 communicates the download message to the client device 312, where the location from which to download the executable program code 334 is a remote location from the firmware download service 306 (e.g., at the storage media 332), and the download message enables the client device 312 to resolve the remote location.

At block 616, the executable program code is cached from the indicated location (e.g., indicated in the download message received from the auto-configuration service). For example, the firmware download service 306 caches the executable program code 334 from the identified location (e.g., at the storage media 332), and maintains the cached executable program code 340 for download to a client device 312 when a download request 336 is received.

If the service delegates are in a cascaded configuration (i.e., "yes" from block 608), then the method continues at FIG. 7 described below. The service delegates are "cascaded" when the firmware download service 306 is a delegate of the remote management service 304 which, in turn, is a delegate of the auto-configuration service 302.

Figure 7:
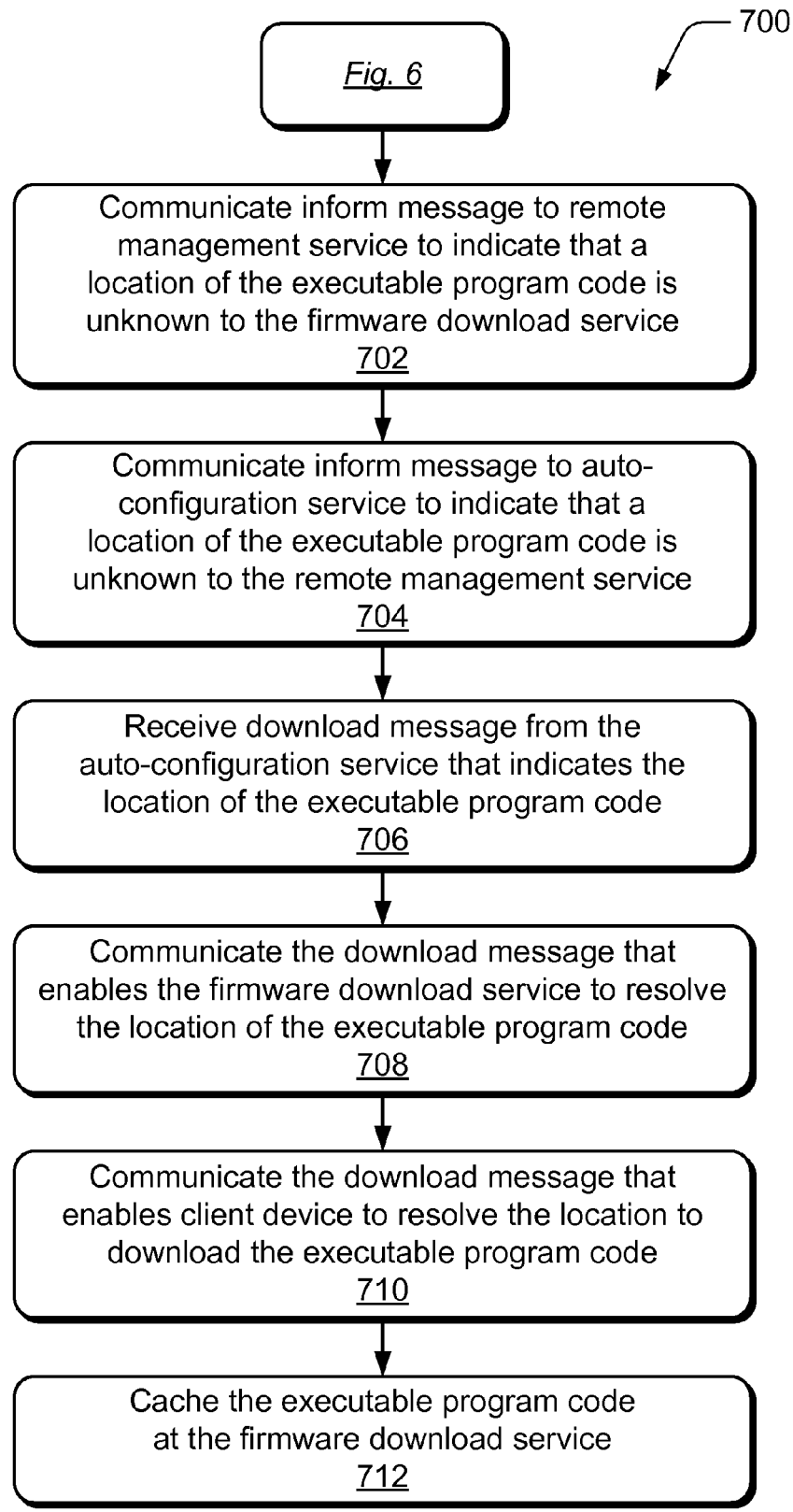
FIG. 7 illustrates example method(s) for firmware cache coherence in accordance with one or more embodiments.

FIG. 7 illustrates example method(s) 700 of firmware cache coherence. The order in which the method is described is not intended to be construed as a limitation, and any number of the described method blocks can be combined in any order to implement the method, or an alternate method.

At block 702, an inform message is communicated to a remote management service to indicate that the location of the executable program code is unknown to the firmware download service. For example, the firmware download service 306 communicates an inform message to the remote management service 304, and the message includes an identifier of the client device 312 from which the download request 336 is received. The inform message from the firmware download service 306 indicates that the location of the executable program code 334 requested by the client device 312 is unknown to the firmware download service.

At block 704, the inform message is communicated to an auto-configuration service to indicate that a location of the executable program code is unknown to the remote management service. For example, the remote management service 304 then communicates the inform message to the auto-configuration service 302, and the inform message indicates that the location of the executable program code 334 requested by the client device 312 at the firmware download service 306 is also unknown to the remote management service 304.

At block 706, a download message is received from the auto-configuration service that indicates the location of the executable program code. For example, the remote management service 304 receives a download message from the auto-configuration service 302 and the download message indicates the location of the executable program code 334 at the networked storage media 332.

At block 708, the download message is communicated to enable the firmware download service to resolve the location of the executable program code. For example, the remote management service 304 then communicates the download message that is received from the auto-configuration service 302 to the firmware download service 306, and the message indicates the location of the executable program code 334 at the storage media 332.

At block 710, the download message is communicated that enables the client device to resolve the location from which to download the executable program code. For example, the firmware download service 306 communicates the download message to the client device 312, where the location from which to download the executable program code 334 is a remote location from the firmware download service 306 (e.g., at the storage media 332), and the download message enables the client device 312 to resolve the remote location and download the executable program code 334.

At block 712, the firmware download service caches the executable program code from the indicated location (e.g., indicated from the auto-configuration service via the remote management service). For example, the firmware download service 306 caches the executable program code 334 from the identified location (e.g., at the storage media 332), and maintains the cached executable program code 340 for download to a client device 312 when a download request 336 is received.

Figure 8:
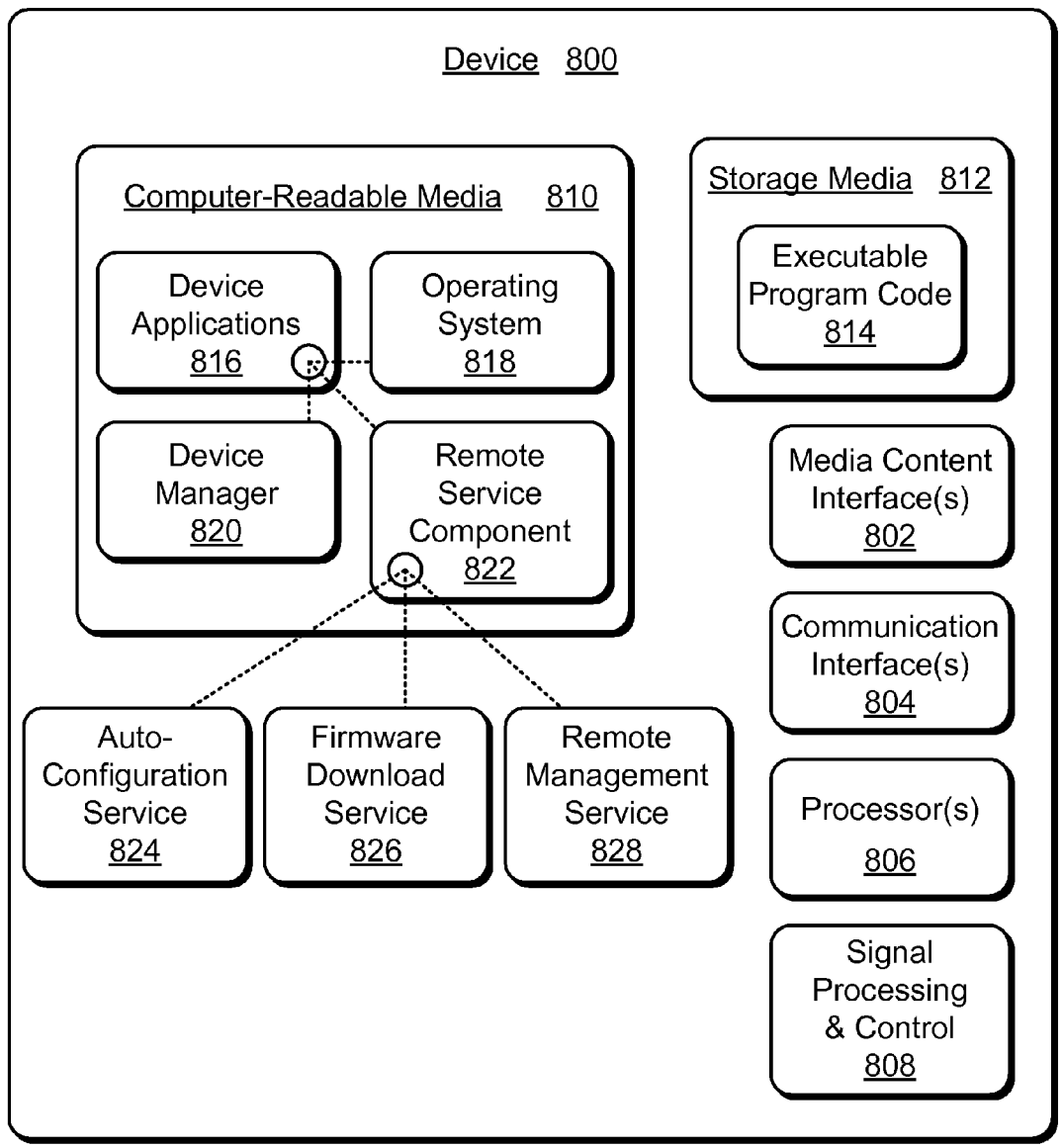
FIG. 8 illustrates various components of an example device which can implement embodiments of firmware cache coherence.

FIG. 8 illustrates various components of an example device 800 that can be implemented as any form of a computer, electronic, appliance, and/or media device to implement various embodiments of firmware cache coherence. Device 800 can include one or more media content interfaces 802 via which any type of audio, video, and/or image media content can be received from a media content source and/or distributed to various devices, such as media devices, client devices, and customer premise equipment. The media content interfaces 802 can include Internet Protocol (IP) inputs over which streams of media content are received and/or distributed via an IP-based network.

Device 800 further includes one or more communication interfaces 804 that can be implemented as any one or more of a serial and/or parallel interface, a wireless interface, any type of network interface, a modem, and as any other type of communication interface. The communication interfaces 804 provide a connection and/or communication links between device 800 and communication network(s) by which other communication, electronic, and computing devices can communicate data and media content with device 800, such as remote management and auto-configuration data.

Device 800 can include one or more processors 806 (e.g., any of microprocessors, controllers, and the like) which process various computer-executable instructions to control the operation of device 800 and to implement embodiments of firmware cache coherence. Alternatively or in addition, device 800 can be implemented with any one or combination of hardware, firmware, or fixed logic circuitry that is implemented in connection with signal processing and control circuits which are generally identified at 808.

Device 800 can also include computer-readable media 810, such as one or more memory components, examples of which include random access memory (RAM), non-volatile memory (e.g., any one or more of a read-only memory (ROM), flash memory, EPROM, EEPROM, etc.), and a disk storage device. A disk storage device can include any type of magnetic or optical storage device, such as a hard disk drive, a recordable and/or rewriteable compact disc (CD), any type of a digital versatile disc (DVD), and the like. Device 800 may also include a storage media 812 to maintain executable program code 814 for software, program, application, and/or firmware downloads and updates to various media devices, client devices, and/or customer premise equipment.

Computer-readable media 810 provides data storage mechanisms to store various device applications 816 and any other types of information and/or data related to operational aspects of device 800. For example, an operating system 818, a device manager 820, and a remote service component 822 of a remote management system can each be maintained as a computer application and/or software module with the computer-readable media 810 and executed on the processors 806 to implement various embodiments of firmware cache coherence. The remote service component 822 can be implemented as a module or interface and can include any one of an auto-configuration service 824, a remote management service 826, and/or a firmware download service 828 that is implemented at a network node (e.g., at a networked computing device).

Although not shown, device 800 can include a system bus or data transfer system that couples the various components within the device. A system bus can include any one or combination of different bus structures, such as a memory bus or memory controller, a peripheral bus, a universal serial bus, and/or a processor or local bus that utilizes any of a variety of bus architectures.

Figure 9:
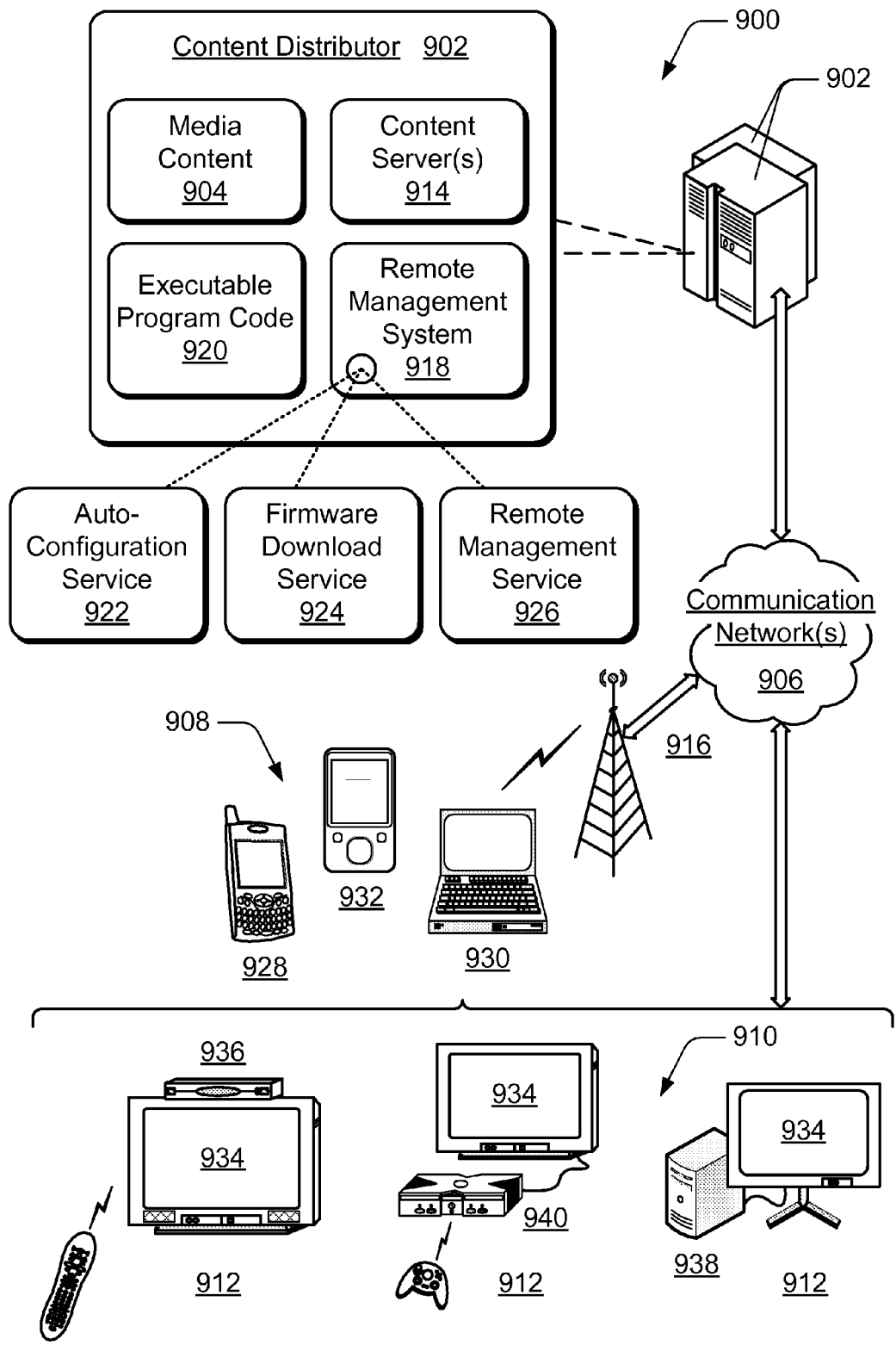
FIG. 9 illustrates an example media content distribution system in which embodiments of firmware cache coherence can be implemented.

FIG. 9 illustrates an example media content distribution system 900 in which various embodiments of firmware cache coherence can be implemented. System 900 includes one or more content distributors 902 that communicate, distribute, or otherwise provide media content 904 (e.g., live television content and/or recorded television content) to any number of various media devices via communication network(s) 906. The various media devices can include wireless media devices 908 as well as other client devices 910 (e.g., wired and/or wireless devices) that are implemented as components in various client systems 912 in the media content distribution system. Any of the various media devices can receive media content, television content, recorded content, program guide data, advertising content, closed captions data, content metadata, and any other audio, video, and/or image content from content server(s) 914 of a content distributor 902.

Communication network(s) 906 can be implemented to include any type of a DSL network, a data network, voice network, broadcast network, an IP-based network, and/or a wireless network 916 that facilitates content distribution as well as data and/or voice communication between the content distributor 902, wireless media devices 908, and other client devices 910. The communication network(s) 906 can be implemented using any type of network topology and/or communication protocol, and can be represented or otherwise implemented as a combination of two or more networks. Any one or more of the arrowed communication links facilitate two-way data communication, such as from the content distributor 902 to a client system 912 and vice-versa.

The media content 904 (to included recorded media content) can include any type of audio, video, and/or image content received from any type of media content source, and can include television programs (or programming), advertisements, commercials, music, movies, and on-demand media content or assets. Other media content can include interactive games, network-based applications, and any other audio, video, and/or image content (e.g., to include program guide data, user interface data, search results and/or recommendations, and the like).

Content distributor 902 can also include a remote management system 918 that can be implemented as computer-executable instructions and executed by processor(s) to implement the various embodiments and/or features of firmware cache coherence as described herein. The remote management system 918 can be implemented for remote management and to distribute executable program code 920 for auto-configuration of the various wireless media devices 908 and/or other client devices 910. The remote management system 918 can be implemented as any one of the remote management systems 100, 200, or 300 described with reference to respective FIGS. 1-3. The content distributor 902 can include an auto-configuration service 922, a remote management service 924, and/or a firmware download service 926 of the remote management system 918.

Content distributor 902 can also be implemented with other various content distribution components to facilitate media content processing and distribution, such as a subscriber manager and a device monitor. The subscriber manager can manage subscriber data for users associated with the various media and client devices, and the device monitor can maintain client state information and monitor the various media devices and other client devices. In addition, a content distributor 902 can be implemented with any number and combination of differing components as further described with reference to the example device shown in FIG. 8.

The wireless media devices 908 can include any type of device implemented to receive and/or communicate wireless data, such as any one or combination of a mobile phone device 928 (e.g., cellular, VoIP, WiFi, etc.), a portable computer device 930, a media device 932 (e.g., a personal media player, portable media player, etc.), and/or any other wireless media device that can receive media content in any form of audio, video, and/or image data. Each of the client systems 912 include a respective client device and display device 934 that together render or playback any form of audio, video, and/or image content, media content, and/or television content.

A display device 934 can be implemented as any type of a television, high definition television (HDTV), LCD, or similar display system. A client device in a client system 912 can be implemented as any one or combination of a television client device 936 (e.g., a television set-top box, a digital video recorder (DVR), etc.), a computer device 938, a gaming system 940, an appliance device, an electronic device, and/or as any other type of client device that may be implemented to receive television content or media content in any form of audio, video, and/or image data in a media content distribution system.

Any of the wireless media devices 908 and other client devices 910 can be implemented with one or more processors, communication components, memory components, signal processing and control circuits, and a media content rendering system. A media or client device may also be associated with a user or viewer (i.e., a person) and/or an entity that operates the device such that a media or client device describes logical devices that include users, software, and/or a combination of devices.

Although embodiments of firmware cache coherence have been described in language specific to features and/or methods, it is to be understood that the subject of the appended claims is not necessarily limited to the specific features or methods described. Rather, the specific features and methods are disclosed as example implementations of firmware cache coherence.

The invention claimed is:

1. A remote management system, comprising:
one or more computing devices that each include at least a memory and a processor, the one or more computing devices configured to implement a firmware download service, a remote management service, and an auto-configuration service;
the remote management service configured to establish a client session with a client device when the client device initiates a session request, the remote management service further configured to provide an address that redirects the client device to the firmware download service when the client device initiates a download request for executable program code;
the firmware download service configured to:
receive the download request for the executable program code from the client device;
communicate an inform message to the auto-configuration service to indicate that a location of the executable program code is unknown to the firmware download service;
receive a download message from the auto-configuration service that enables the firmware download service to resolve the location from which to cache the executable program code; and
facilitate a download of the executable program code to the client device.

2. A remote management system as recited in claim 1, wherein the remote management service is a first delegate of the auto-configuration service, and wherein the firmware download service is a second delegate of the auto-configuration service.

3. A remote management system as recited in claim 1, wherein the remote management service is a delegate of the auto-configuration service, and wherein the firmware download service is a delegate of the remote management service.

4. A remote management system as recited in claim 1, wherein the firmware download service is further configured to cache the executable program code for download to the client device.

5. A remote management system as recited in claim 4, wherein the remote management service is further configured to instruct the firmware download service to cache the executable program code prior to the client device download request for the executable program code.

6. A remote management system as recited in claim 1, wherein the remote management service is further configured to provide a download schedule message to the client device to indicate when the client device can initiate the download request for the executable program code from the firmware download service.

7. A remote management system as recited in claim 1, wherein the firmware download service is further configured to communicate a download message that enables the client device to resolve the location from which to download the executable program code.

8. A remote management system as recited in claim 7, wherein the firmware download service is further configured to cache the executable program code from the location prior to receiving another download request for the executable program code from an additional client device.

9. A remote management system as recited in claim 1, wherein the firmware download service is further configured to:
communicate the inform message to the remote management service to indicate that a location of the executable program code is unknown to the firmware download service; and
receive a download message from the remote management service that enables the firmware download service to resolve the location from which to cache the executable program code.

10. A remote management system as recited in claim 9, wherein the remote management service is further configured to:
receive the inform message from the firmware download service;
communicate the inform message to the auto-configuration service to indicate that the location of the executable program code is unknown to the remote management service;
receive the download message from the auto-configuration service that indicates the location of the executable program code; and
communicate the download message that enables the firmware download service to resolve the location from which to cache the executable program code.

11. A method implemented by one or more computing devices, the method comprising:
receiving a session request from a client device at a remote management service that establishes a client session with the client device;
providing an address to the client device that redirects the client device to a firmware download service that facilitates a download of executable program code;
receiving a download request for the executable program code from the client device;
communicating an inform message to an auto-configuration service to indicate that the location of the executable program code is unknown to the firmware download service;
receiving a download message from the auto-configuration service that enables the firmware download service to resolve the location of the executable program code; and
communicating the download message that enables the client device to resolve the location from which to download the executable program code.

12. A method as recited in claim 11, further comprising caching the executable program code at the firmware download service for download to the client device.

13. A method as recited in claim 11, further comprising instructing the firmware download service to cache the executable program code prior to the client device initiating the download request for the executable program code.

14. A method as recited in claim 11, further comprising communicating a download schedule message to the client device to indicate when the client device can initiate the download request for the executable program code from the firmware download service.

15. A method as recited in claim 11, wherein the location from which to download the executable program code is a remote location from the firmware download service, and wherein the download message enables the client device to resolve the remote location.

16. A method as recited in claim 15, further comprising caching the executable program code at the firmware download service from the remote location prior to receiving another download request for the executable program code from an additional client device.

17. A method as recited in claim 11, further comprising:
communicating the inform message to the remote management service to indicate that the location of the executable program code is unknown to the firmware download service; and
receiving the download message from the remote management service that enables the firmware download service to resolve the location from which to cache the executable program code.

18. A method as recited in claim 17, further comprising:
communicating the inform message to the auto-configuration service to indicate that the location of the executable program code is unknown to the remote management service;
receiving the download message from the auto-configuration service that indicates the location of the executable program code; and
communicating the download message that enables the firmware download service to resolve the location from which to cache the executable program code.

19. A non-transitory computer-readable storage media comprising instructions that are executable and, responsive to executing the instructions, one or more computing devices implement a firmware download service, a remote management service, and an auto-configuration service to:
receive a session request from a client device at the remote management service that establishes a client session with the client device;
provide an address to the client device that redirects the client device to the firmware download service that facilitates a download of executable program code;
receive a download request for the executable program code from the client device;
communicate an inform message to the auto-configuration service to indicate that the location of the executable program code is unknown to the firmware download service;
receive a download message from the auto-configuration service that enables the firmware download service to resolve the location of the executable program code; and
communicate the download message that enables the client device to resolve the location from which to download the executable program code.

20. A non-transitory computer-readable storage media as recited in claim 19, further comprising additional instructions that are executable and, responsive to executing the additional instructions, the one or more computing devices cache the executable program code at the firmware download service for download to the client device.

* * * * *